(12) United States Patent
Lin

(10) Patent No.: US 6,814,395 B1
(45) Date of Patent: Nov. 9, 2004

(54) ELECTRONIC SPOILER HAVING ADJUSTABLE HEIGHTS

(76) Inventor: Yung-Fa Lin, 6F, No. 2, Lane 163, Hsin I Rd., Panchiao City, Taipei Hsien (TW)

( * ) Notice: Subject to any disclaimer, the term of this patent is extended or adjusted under 35 U.S.C. 154(b) by 0 days.

(21) Appl. No.: 10/674,389

(22) Filed: Oct. 1, 2003

(51) Int. Cl.[7] ............................................. B62D 37/02
(52) U.S. Cl. .................................. 296/180.1; 296/180.5
(58) Field of Search ......................... 296/180.1, 180.5, 296/190.09

(56) References Cited

U.S. PATENT DOCUMENTS

| | | | | |
|---|---|---|---|---|
| 3,455,594 A | * | 7/1969 | Mrlik et al. | 296/180.5 |
| 4,660,879 A | * | 4/1987 | Kobayashi et al. | 296/180.5 |
| 4,773,692 A | * | 9/1988 | Schleicher et al. | 296/180.5 |
| 5,923,245 A | * | 7/1999 | Klatt et al. | 340/479 |
| 6,030,028 A | * | 2/2000 | Radmanic et al. | 296/180.5 |
| 6,170,904 B1 | * | 1/2001 | Schaedlich et al. | 296/180.1 |
| 6,382,708 B1 | * | 5/2002 | Erdelitsch et al. | 296/180.5 |
| 2003/0090126 A1 | * | 5/2003 | Adams | 296/180.1 |

FOREIGN PATENT DOCUMENTS

| | | | | |
|---|---|---|---|---|
| DE | 4207658 A1 | * | 9/1993 | 296/180.5 |
| DE | 4305115 A1 | * | 8/1994 | 296/180.5 |
| FR | 2624823 A1 | * | 6/1989 | 296/180.1 |
| JP | 60088687 A | * | 5/1985 | 296/180.1 |
| JP | 60163773 A | * | 8/1985 | 296/180.5 |
| JP | 61222875 A | * | 10/1986 | 296/180.1 |
| JP | 02120195 A | * | 5/1990 | 296/180.5 |
| JP | 03169781 A | * | 7/1991 | 196/180.5 |
| JP | 03189275 A | * | 8/1991 | 196/180.5 |

* cited by examiner

*Primary Examiner*—D. Glenn Dayoan
*Assistant Examiner*—Paul Chenevert
(74) *Attorney, Agent, or Firm*—Birch, Stewart, Kolasch & Birch, LLP

(57) ABSTRACT

An electronic spoiler having adjustable heights includes an electronic elevator mechanism and a spoiler. The electronic spoiler having adjustable heights is disposed in a rear trunk of an automobile, and utilizes the electronic elevator mechanism for adjusting heights of the spoiler. The structure is characterized that, the electronic elevator mechanism is consisted of a stand assembly, a trunk upper seat, spoiler positioning seats and a transmission system; and is disposed at an appropriate location in the rear trunk. The trunk upper seat is disposed at the trunk by penetrating guide tubes through the stand assembly. Above the guide tubes are the spoiler positioning seats fastened by screwing means to further join to the spoiler. An upper-and-lower limit switch disposed at the fixed stand define a maximum range of the elevator mechanism, and is capable of adjusting heights of the spoiler in a non-segmented manner for elevating stability during high-speed traveling.

8 Claims, 5 Drawing Sheets

ELECTRONIC SPOILER HAVING ADJUSTABLE HEIGHTS

BACKGROUND OF THE INVENTION (a) Field of the Invention

The invention relates to an electronic spoiler having adjustable heights, and more particularly, to an elevator structure utilizing an electronic motor for ascending and descending heights of a spoiler.

(b) Description of the Prior Art

A prior spoiler is generally fixed at a rear trunk of an automobile by means of left and right supporting stands. With an invariable height, the spoiler is fastened to the supporting stands. Or, the supporting stands are provided in a flexible triangle mechanism. However, movements of the flexible triangle mechanism are restricted by physical limitations, and thus heights thereof yet fail to reach ranges desired. A spoiler adopted in automobile aeromechanics operates with same fundamental principles as those of aerofoils of airplanes. A distinction between the two is that an aerofoil of an airplane is for producing uplifting forces, whereas a spoiler of an automobile is for producing downward forces. Referring to FIG. 1 showing a sectional view of an aerofoil of an airplane, when airflows approach the aerofoil, because airflows above the aerofoil travel with longer distances than those of airflows below the aerofoil, air pressures above the aerofoil are reduced while pressures below the aerofoil get relatively larger. Consequently, uplifting forces are produced, with a pressure difference enlarging as the speed gets faster. Therefore, suppose the aerofoil is turned up-side-down, a simple automobile spoiler, which has opposite effects namely downward forces commonly referred to as downforces, is formed. When an automobile travels at high speeds, spoilers having different heights provide different downforces for allowing the automobile with better stability. Hence, it is essential that spoilers incapable of meeting the aforesaid requirements be advanced.

SUMMARY OF THE INVENTION

In the view of the aforesaid shortcomings of the prior spoiler, the primary object of the invention is to provide a spoiler having adjustable heights for offering different pressures, thereby allowing an automobile with better stability during high-speed traveling.

To accomplish the aforesaid object, an electronic spoiler having adjustable heights according to the invention comprises an electronic elevator mechanism and a spoiler. The electronic elevator mechanism is consisted of a stand assembly, a trunk upper seat, spoiler positioning seats and a transmission system. The stand assembly includes a fixed section and a flexible section, both preferably made of aluminum alloy plates. The fixed section is T-shaped when viewing from a facade thereof and U-shaped when viewing from a side thereof, and is located inside a trunk cover. The fixed section is disposed with an orifice at two sides thereof, respectively. Each orifice has a size same as a diameter of guide tubes fixed at two sides of the flexible section. Above the orifices are vertical hollow pipes for allowing the guide tubes to penetrate through. A bottom center portion of the fixed section is provided with a screw positioning seat for upholding a lower portion of a screw. The transmission system includes a moderating motor and the screw. The moderating motor is arranged at a center portion of an upper surface of the flexible section, and is penetrated through the fixed section to join with the screw below. When the screw is fastened with a screw bore plate at the center portion of the flexible section, a lower end of the screw is prevented from wavering by being inserted into the screw positioning seat. The guide tubes fixed at two ends of the flexible section are made of chromate-treated steel pipes for avoiding rapid oxidation and wear, and are mainly for maintaining proper directions of the flexible section, so as to enable the moderating motor to rotate the screw in forward or reverse directions to further drive the flexible section for vertical up-and-down movements. A trunk cover is excavated with two openings having a size same as that of the guide tubes but smaller than the diameter of the vertical hollow pipes, such that the trunk upper seat is secured with the vertical hollow pipes in the trunk. The trunk upper seat is a structure having universal bearings. In conjunction with rotatable directions of the universal bearings, openings at centers of the universal bearings are maintained to vertically face upward at all times when the trunk upper seat is disposed at the trunk cover, with the openings at the center allow the guide tubes with up-and-down sliding movements. When the aforesaid structure is fastened to the trunk cover, a lower portion of the trunk upper seat is disposed with a circular groove for placing a water-resistant rubber ring, which prevents water from leaking through openings provided at the trunk cover. The spoiler positioning seats are mounted onto upper ends of the guide pipes by means of screwing, and the spoiler is secured on the spoiler positioning seats. Via a power control compartment and in coordination with an upper-and-lower limit switch, the moderating motor is capable of adjusting heights of the spoiler in a non-segmented manner within a certain range, thereby accomplishing electronically adjusting heights of the spoiler.

According to the aforesaid electronic spoiler having adjustable heights, different heights are obtained for offering different pressures, such that not only excessive downforces but also excessive fuel consumption is not resulted, and better stability is provided during high-speed traveling of an automobile.

DETAILED DESCRIPTION OF THE PREFERRED EMBODIMENTS

To better understand structures, devices and characteristics of the electronic spoiler having adjustable heights according to the invention, detailed descriptions of preferred embodiments shall be given with the accompanying drawings below.

Figure 1:
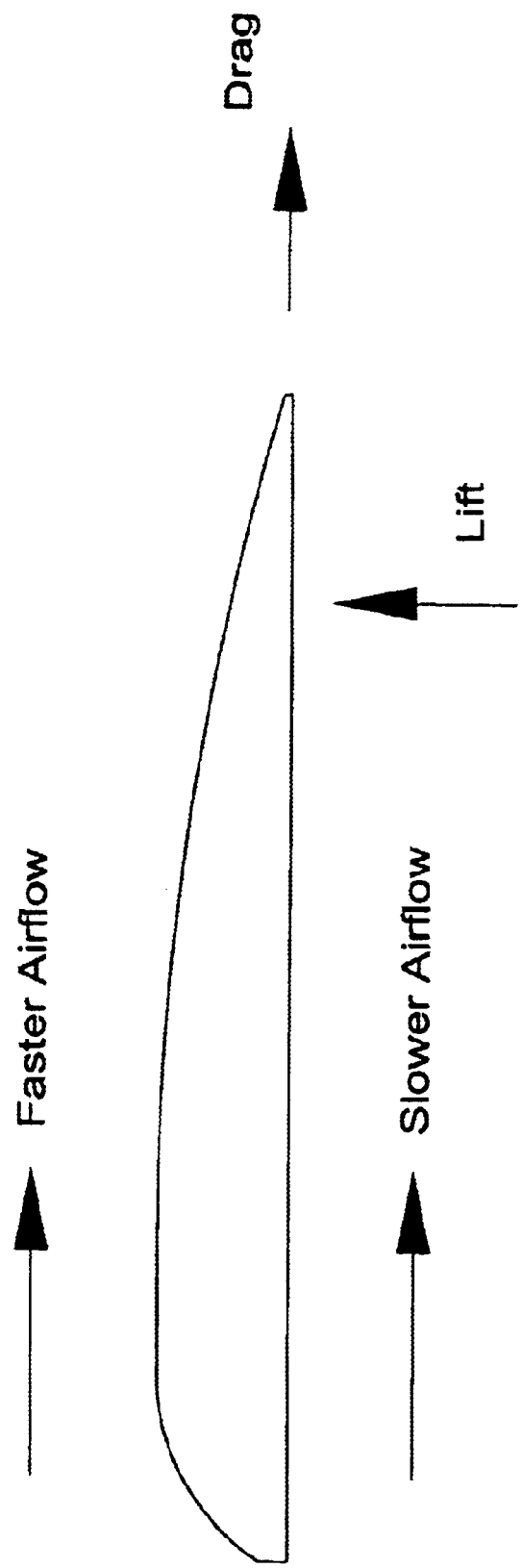
FIG. 1 shows a schematic view illustrating principles of a spoiler.
Figure 2:
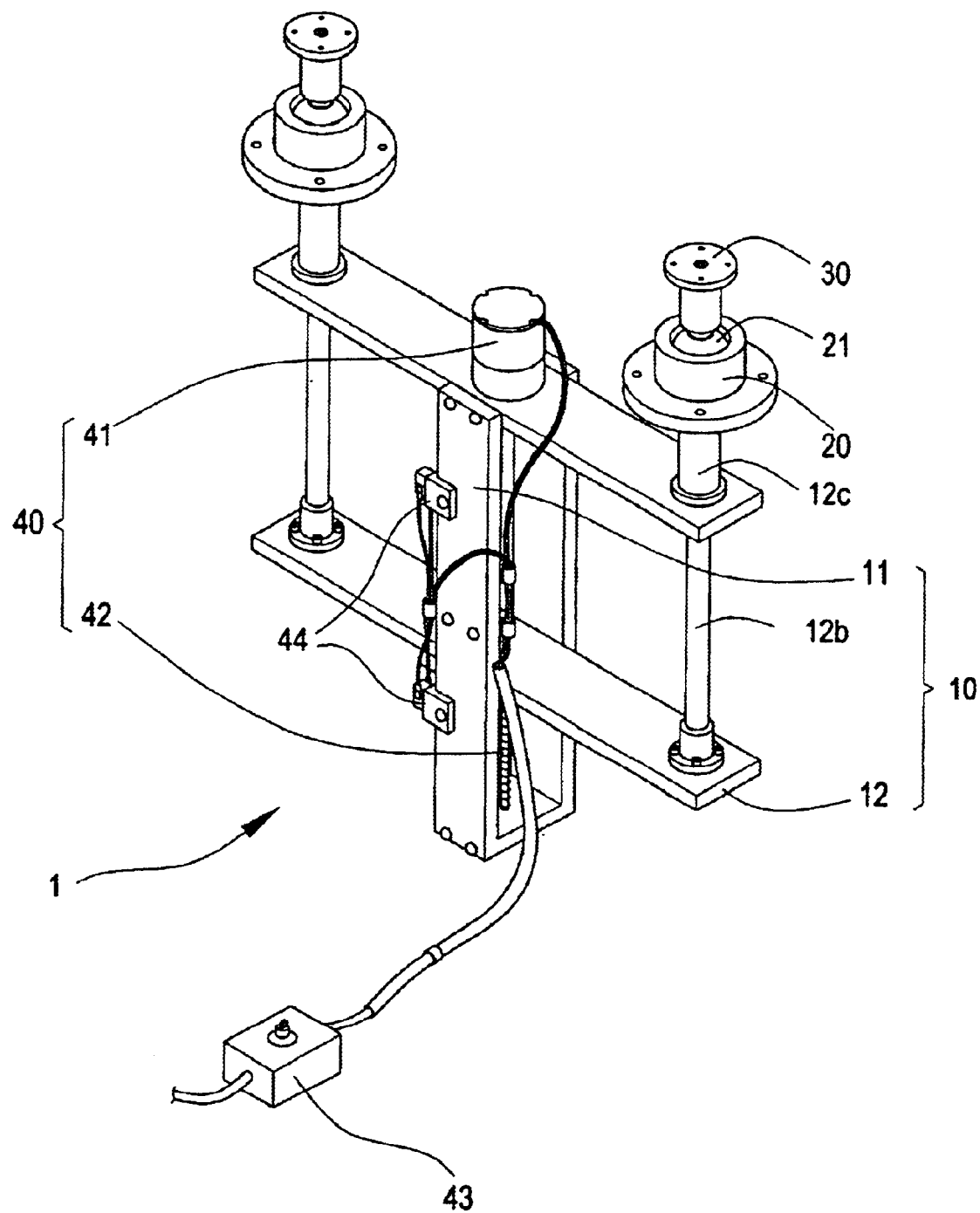
FIG. 2 shows an exploded elevational view according to the invention.
Figure 3:
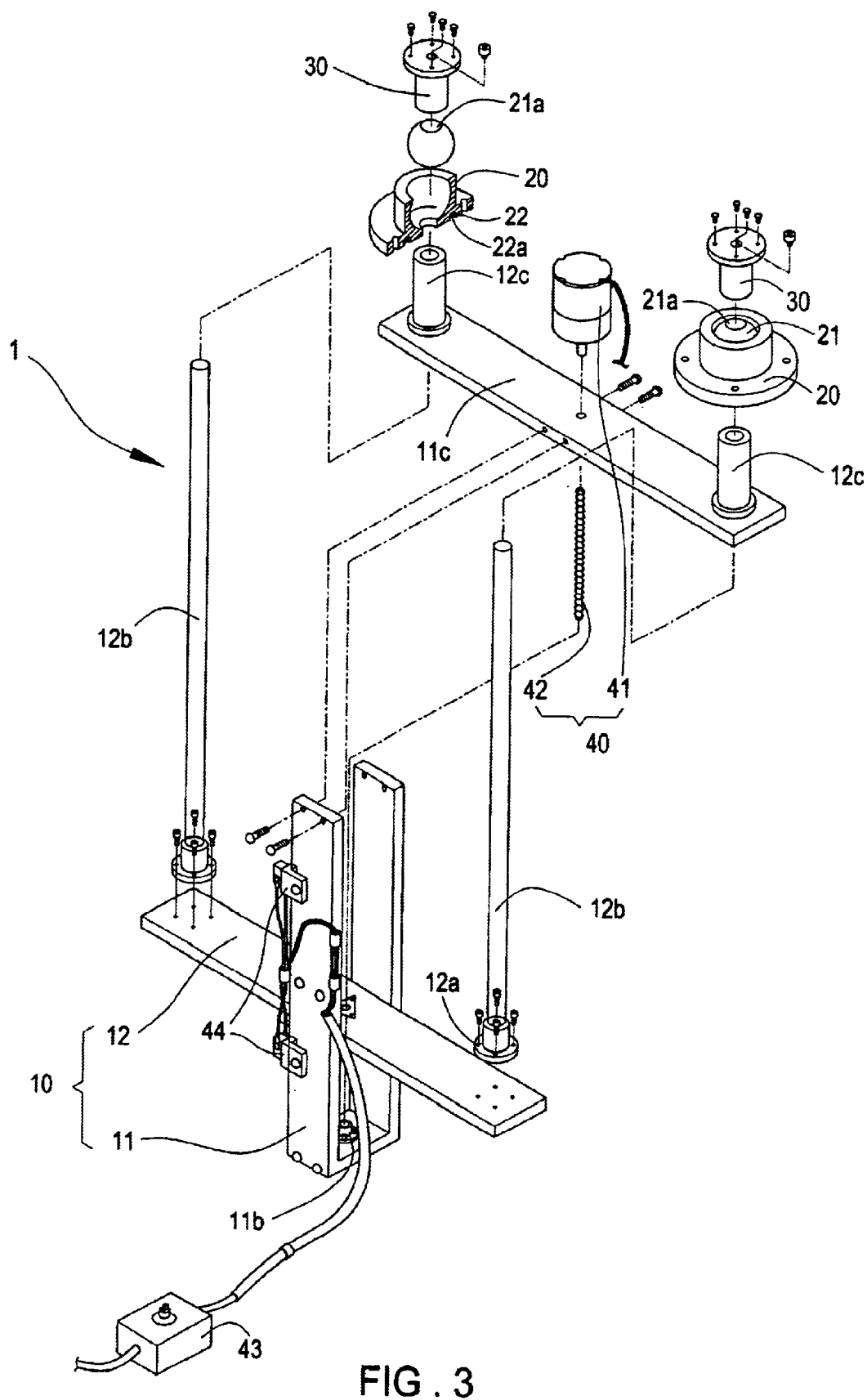
FIG. 3 shows an exploded elevational view according to the invention.
Figure 4:
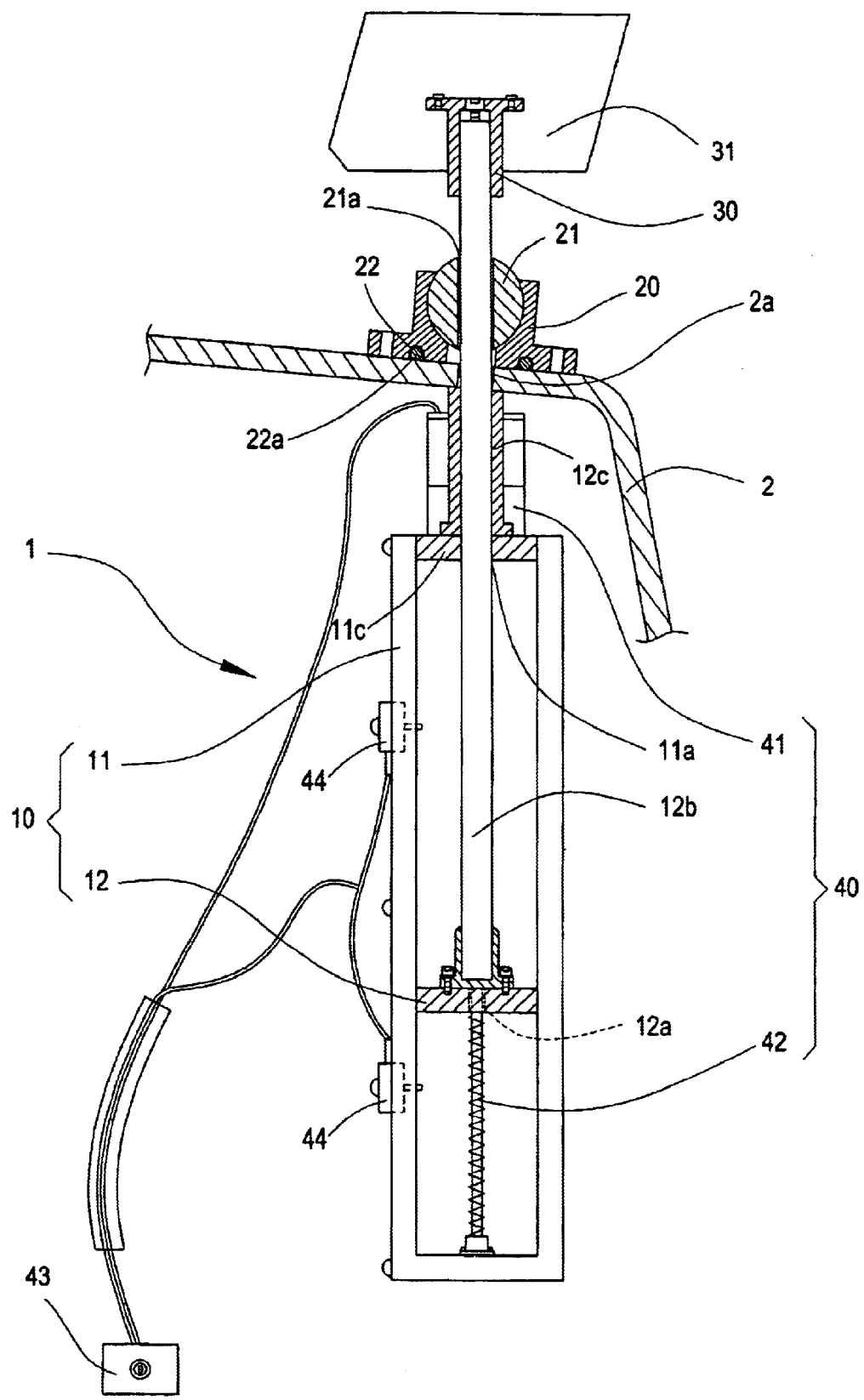
FIG. 4 shows a sectional view of an embodiment according to the invention.
Figure 5:
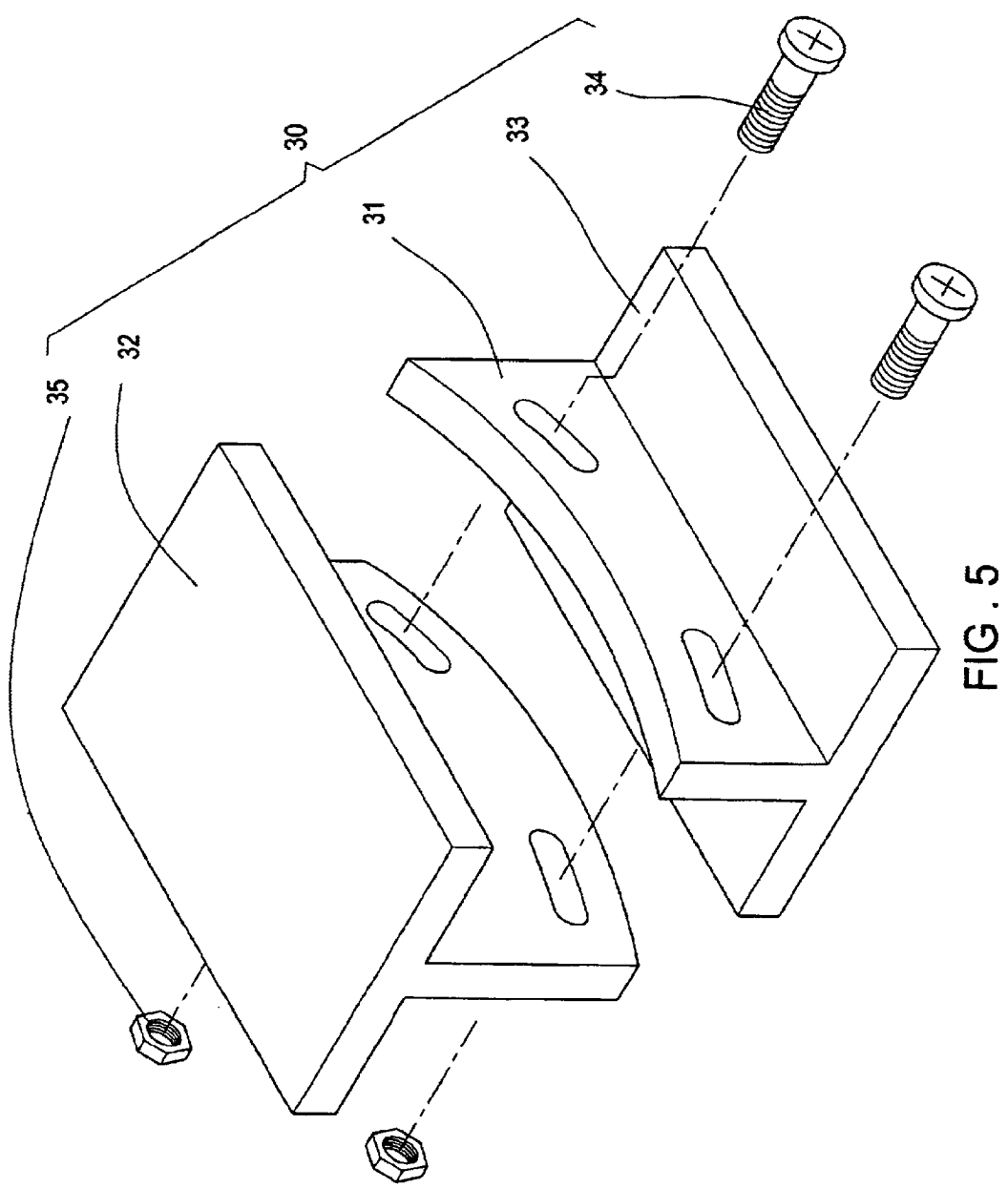
FIG. 5 shows a schematic view illustrating a spoiler positioning seat of a spoiler in another embodiment.

Referring to FIGS. 2, 3 and 4, the electronic spoiler having adjustable heights comprises an electronic elevator mechanism and a spoiler. Wherein, an electronic elevator mechanism 1 is consisted of a stand assembly 10, trunk upper seats 20, spoiler positioning seats 30 and a transmission system 40. The stand assembly 10 includes a fixed section 11 and a flexible section 12 both preferably made of aluminum alloy plates. The fixed section 11 is a T-shape when view from a facade thereof and a U-shape when view from a side thereof, and is located inside a trunk cover 2. The fixed section 11 is disposed with an orifice 11a at two sides thereof, respectively. Each orifice 11a has a size same as a diameter of guide tubes 12b fixed at two sides of the flexible section 12. Above the orifices 11a are vertical hollow pipes 12c for allowing the guide tubes 12b to penetrate through. A bottom center portion of the fixed section 11 is provided with a screw positioning seat 11b for upholding a lower portion of a screw 42. The transmission system 40 includes a moderating motor 41 and the screw 42. The moderating motor 41 is arranged at a center portion of an upper surface of the flexible section 11c, and is penetrated through the fixed section 11 to join with the screw 42 below. When the screw 42 is fastened with a screw bore plate 12a at the center portion of the flexible section 12, a lower end of the screw 42 is prevented from wavering by being inserted into the screw positioning seat 11b. The guide tubes 12b fixed at two ends of the flexible section 12 are made of chromate-treated steel pipes for avoiding rapid oxidation and wear, and are mainly for maintaining proper directions of the flexible section 12, so as to enable the moderating motor 41 to rotate the screw 42 in forward or reverse directions to further drive the flexible section 12 for vertical up-and-down movements. A trunk cover 2 is excavated with two openings 2a having a size same as that of the guide tubes 12b but smaller than the diameter of the vertical hollow pipes 12c, such that the trunk upper seat 20 is secured with the vertical hollow pipes 12c in the trunk. The trunk upper seat 20 is a structure having universal bearings 21. In conjunction with rotatable directions of the universal bearings 21, openings 21a at centers of the universal bearings 21 are maintained to vertically face upward at all times when the trunk upper seat 20 is disposed at the trunk cover 2, with the openings 21a at the center allow the guide tubes 12b with up-and-down sliding movements. When the aforesaid structure is fastened to the trunk cover 2, a lower portion of the trunk upper seat 20 is disposed with a circular groove 22 for placing a water-resistant rubber ring 22a, which prevents water from leaking through openings 2a provided at the trunk cover 2. The spoiler positioning seats 30 are mounted onto upper ends of the guide pipes 12b by means of screwing, and the spoiler 31 is secured on the spoiler positioning seats 30. Via a power control compartment 43 and in coordination with an upper-and-lower limit switch 44, the moderating motor 41 is capable of adjusting heights of the spoiler 31 in a non-segmented manner within a certain range, thereby accomplishing electronically adjusting heights of the spoiler 31. In addition, the spoiler positioning seats 30 may be manufactured in to seats for manually adjusting angles of the spoiler 31. Referring to FIG. 5, each spoiler positioning seat 30 is consisted of an upper seat 32, a lower seat 33, adjusting screws 34 and screw nuts 35. The upper and lower seats 32 and 33 are T-shaped and have corresponding semi-circular apertures at two sides of vertical sections thereof, so as to adjust the screws 34 and the screw nuts 35 to join and fasten the upper and lower seats 32 and 33 with each other. To adjust angles of the spoiler 31, only the adjusting screws 34 and screw nuts 35 are first disengaged, and then screwed back after having adjusted angles of the spoiler 31. Furthermore, the power control compartment 43 may be connected to a speed sensor made of an electronic element for controlling heights of the spoiler by accessing signals according to speed variations of the automobile.

Conclusive from the above, the electronic spoiler having adjustable heights utilizing an electronic elevator mechanism for adjusting heights of the spoiler is capable of adjusting heights of the spoiler, such that better stability is obtained during high-speed traveling of the automobile. It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. An electronic spoiler having adjustable heights, assembled at a rear trunk cover of an automobile, and comprising an electronic elevator mechanism and a spoiler; wherein, the electronic elevator being consisted of:
a stand assembly having a fixed section and a flexible section, both preferably made of aluminum alloy plates; wherein, the fixed section being a T-shape when viewing from a facade thereof and a U-shape when viewing from a side thereof, and being located within a trunk cover; the fixed section being provided with orifices at two sides thereof and a moderating motor at a center portion thereof; above the orifices being correspondingly disposed vertical hollow pipes for allowing guide tubes fixed at two ends of the flexible stand to penetrate through; the flexible stand being a plate-like structure having a screw plate at a center portion thereof; the fixed stand and the flexible stand being joined by a transmission system in between; a trunk cover being excavated with two openings corresponding with a trunk upper seat fixed at an outer side of the trunk cover; and spoiler positioning seats being mounted at upper ends of the guide tubes by means of screwing; and the transmission system having the moderating motor connected to a screw; wherein, the moderating motor being disposed at a center portion of the fixed stand and connected with the screw below to further be screwed to the screw plate at the flexible stand; a lower end of the screw is inserted into a screw positioning seat below a lower center portion of the fixed stand; and a power control compartment being utilized for controlling power on and off of the moderating motor.

2. The electronic spoiler having adjustable heights in accordance with claim 1, wherein the stand assembly being made of an aluminum alloy.

3. The electronic spoiler having adjustable heights in accordance with claim 1, the trunk upper seat being a universal bearing structure.

4. The electronic spoiler having adjustable heights in accordance with claim 3, wherein each universal bearing being provided with an opening having a diameter same as that of the guide tubes for allowing the guide tubes with up-and-down sliding movements.

5. The electronic spoiler having adjustable heights in accordance with claim 1, wherein a lower portion of the trunk upper seat being disposed with a circular groove for placing a water-resistant rubber ring.

6. The electronic spoiler having adjustable heights in accordance with claim 1, wherein the spoiler positioning seats being manufactured into seats for manually adjusting angles of the spoiler, and each having an upper seat, a lower seat, adjusting screws and screw nuts; and the upper and lower seats being T-shaped and having corresponding semi-circular apertures at two sides of vertical sections thereof, thereby adjusting the screws and the screw nuts to join and fasten the upper and lower seats with each other.

7. The electronic spoiler having adjustable heights in accordance with claim 1, wherein the guide tubes being chromate-treated steel pipes.

8. The electronic spoiler having adjustable heights in accordance with claim 1, wherein the power control compartment being connected with a speed sensor.

* * * * *